United States Patent
Katayama

(10) Patent No.: US 8,364,741 B2
(45) Date of Patent: Jan. 29, 2013

(54) MOTION-COMPENSATING DEVICE WITH BOOTH MULTIPLIER THAT REDUCES POWER CONSUMPTION WITHOUT INCREASING THE CIRCUIT SIZE

(75) Inventor: Yoichi Katayama, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 1010 days.

(21) Appl. No.: 12/392,755

(22) Filed: Feb. 25, 2009

(65) Prior Publication Data

US 2009/0228540 A1 Sep. 10, 2009

(30) Foreign Application Priority Data

Mar. 5, 2008 (JP) ................................ 2008-054654

(51) Int. Cl.
*G06F 7/533* (2006.01)

(52) U.S. Cl. ........ 708/626; 708/625; 708/627; 708/628; 708/629

(58) Field of Classification Search ........................ None
See application file for complete search history.

(56) References Cited

U.S. PATENT DOCUMENTS

| | | | | |
|---|---|---|---|---|
| 6,535,902 B2 * | 3/2003 | Goto | ............................. | 708/629 |
| 6,785,702 B2 * | 8/2004 | Chen et al. | ..................... | 708/628 |
| 2005/0125478 A1 * | 6/2005 | Ng | ................................ | 708/620 |
| 2005/0125480 A1 * | 6/2005 | Yeh et al. | ...................... | 708/620 |
| 2006/0143260 A1 * | 6/2006 | Peng et al. | ..................... | 708/620 |
| 2009/0094303 A1 * | 4/2009 | Katayama | ...................... | 708/300 |
| 2009/0228538 A1 * | 9/2009 | Nagano et al. | ................. | 708/209 |

FOREIGN PATENT DOCUMENTS

| | | |
|---|---|---|
| JP | 06-044291 A | 2/1994 |
| JP | 2004-258141 A | 9/2004 |

OTHER PUBLICATIONS

Hanho Lee, "A power-aware scalable Pipelined Both Multipler," SOC Conference, 2004, Proceedings, IEEE Internaltional Sep. 12-15, 2004, pp. 123-126.*
Goldovsky, A., et al., "Design and Implementation of a 16 by 16 Low-Power Two's Complement Multiplier," Proceeding. IEEE Internation Symposium on Circuits and Systems (ISCAS 2000), (May 28-31, 2000), pp. 345-348.*
Ruiz, G. A. et al., Low-cost VLSI Architecture Design for Forward Quantization of H.264/AVC, year: 2000, pp. 1-12.*

* cited by examiner

*Primary Examiner* — Tammara Peyton
(74) *Attorney, Agent, or Firm* — Sughrue Mion, PLLC

(57) ABSTRACT

A multiplier includes an operation unit that adds or subtracts a first group selected from a current input data, and a second group selected from a next input data corresponding to the first group to generate an operation result, a Booth's encoder that encodes the operation result according to Booth's algorithm, and generates code data, a partial product generation unit that calculates a partial product from the code data as a first partial product, and calculates, in a case where the first group and the second group are specific combination, a second partial product, and an adder that cumulatively adds an output from the partial product generation unit. The specific combination is a combination in which the highest-order bit of each of the first group and the second group is the same value, and the third least significant bit obtained after the subtraction operation is 1.

10 Claims, 15 Drawing Sheets

GROUP B'

| | 000 | 001 | 010 | 011 | 100 | 101 | 110 | 111 |
|---|---|---|---|---|---|---|---|---|
| 000 | 0 | 0 | 0 | 0 | 0 | 0 | 0 | 0 |
| 001 | 0 | 0 | 0 | 1 | 0 | 0 | 0 | 0 |
| 010 | 0 | 0 | 1 | 1 | 0 | 0 | 0 | 0 |
| 011 | 0 | 1 | 1 | 1 | 0 | 0 | 0 | 0 |
| 100 | 0 | 0 | 0 | 0 | 0 | 0 | 0 | 0 |
| 101 | 0 | 0 | 0 | 0 | 0 | 0 | 0 | 1 |
| 110 | 0 | 0 | 0 | 0 | 0 | 0 | 1 | 1 |
| 111 | 0 | 0 | 0 | 0 | 0 | 1 | 1 | 1 |

GROUP A

Fig. 10

MOTION-COMPENSATING DEVICE WITH BOOTH MULTIPLIER THAT REDUCES POWER CONSUMPTION WITHOUT INCREASING THE CIRCUIT SIZE

BACKGROUND

1. Field of the Invention

The present invention relates to a multiplier capable of performing a filter operation during motion compensation processing for use in compression-encoding/decoding of a moving picture, for example, and a motion-compensating device including the multiplier.

2. Description of Related Art

Latest codecs such as H.264/AVC and VC-1 have been adopted as a standard for next-generation digital versatile disks (DVDs) and digital televisions (DTVs). In such decoding devices, a filter operation of a filter for motion-compensating prediction in a motion-compensating section may be implemented using multipliers to which Booth's algorithm is applied.

An operation time of each multiplier is equal to the sum of a time required for adding partial products to each other and a time required for absorbing a carry signal. To achieve a higher operation speed, it is necessary to reduce the processing times. To reduce the number of adders in order to reduce the processing times, it is necessary to reduce the number of partial products. To achieve this, a multiplier is divided into sets of a plurality of consecutive bits of multipliers to generate a partial product corresponding to each set, thereby enabling a reduction in the number of partial products. In this case, a secondary Booth's algorithm is used to reduce the number of partial products. The secondary Booth's algorithm is a technique for reducing the number of partial products by applying such an algorithm that a multiplier is divided into sets of two bits to form groups of three bits in total including two bits of each set and a most significant bit of a low-order set.

When the filter operation is carried out using the above-mentioned codecs, however, if the filter operation is implemented by the multipliers to which Booth's algorithm is applied, a large number of multipliers are required, leading to an increase in circuit size. Likewise, if the filter operation for use in generating a predicted image for inter-picture prediction in H.264 is implemented by the multipliers to which Booth's algorithm is applied, the circuit size increases.

Japanese Unexamined Patent Application Publication No. 6-44291 (Endo) discloses a discrete cosine transformer which enables a reduction in circuit size by reducing the number of multipliers as much as possible. FIG. 15 is a diagram illustrating the discrete cosine transformer disclosed by Endo. The discrete cosine transformer includes adders 612, 640, and 642, a difference calculation unit 610, a register 614, multiplexers 616 and 652, multiplexer-multipliers 618, 620, 622, and 634, butterfly adders 626, 628, 630, 632, 644, 646, 648, and 650, multipliers 624, 636, and 638, and a quantizer 654. Difference data is obtained as an alternating-current component of image data by the difference calculation unit 610, and the difference data thus obtained is subjected to DCT. By performing the DCT on the difference data, the number of necessary coefficients is reduced, resulting in a reduction in the number of multipliers. Furthermore, when the same coefficient is multiplied by different data, the multiplication is executed by time-sharing using the multiplexer-multipliers 618, 620, 622, and 634. As a result, the number of multipliers can be further reduced. Moreover, when coefficients to be multiplied are multiplied in advance by values contained in a quantization table of the quantizer 654, the number of multiplications is reduced. Thus, the discrete cosine transformer as disclosed by Endo achieves a high-speed operation by using characteristics of discrete cosine transform and by using the multiplication and butterfly operation.

Further, Japanese Unexamined Patent Application Publication No. 2004-258141 (Okumura) discloses a multiplication device for shortening a delay time due to a subtraction performed by a block unit arithmetic unit in a circuit that performs multiple precision arithmetic for Montgomery multiplication residue arithmetic, and for performing an operation with an operation frequency maintained, without the need of separately providing a subtracting circuit.

The multiplication device performs multiplication of a multiplicand A and a multiplier B that are expressed by bit patterns. To carry out the multiplication, the multiplication device includes: a partial product generator that generates a plurality of partial products in the secondary Booth's algorithm from the multiplicand A; an encoder that encodes the multiplier B according to the secondary Booth's algorithm and outputs a selection signal depending on a value "i" specifying three consecutive bits $b_{2i+1}$, $b_{2i}$, and $b_{2i-1}$ of the multiplier B; a selector that selects and outputs one of the plurality of partial products in response to the selection signal; and an adder that adds partial products equal in number to "i" output from the selection circuit, and generates multiplication results. Further, the multiplication device has an operation mode in which the encoder outputs a selection signal for selecting a partial product indicating –A when "i" is 0, and outputs a selection signal for selecting a partial product indicating 0 when "i" is a value other than 0, and the adder generates a two's complement of the multiplicand A from the partial product indicating –A, and outputs the two's complement of the multiplicand A as multiplication results.

SUMMARY

In the discrete cosine transformer disclosed by Endo, however, a large-scale multiplier is used to carry out multiplication at high speed, which leads to an undesirable increase in circuit size. Further, the discrete cosine transformer performs generic processing without particularly using characteristics of an image. Accordingly, to meet a demand for high operation accuracy, the circuit size of the operation unit increases, which leads to an increase in power consumption. The technique disclosed by Okumura also leads to an undesirable increase in circuit size and power consumption.

According to an exemplary embodiment of the present invention, there is provided a multiplier includes an operation unit that adds or subtracts a first group selected from a current input data, and a second group selected from a next input data corresponding to the first group to generate an operation result, a Booth's encoder that encodes the operation result according to Booth's algorithm, and generates code data, a partial product generation unit that calculates a partial product from the code data as a first partial product, and calculates, in a case where the first group and the second group are specific combination, a second partial product, and an adder that cumulatively adds an output from the partial product generation unit. The operation unit divides the input data into sets of two bits from a least significant bit, forms the first group and second group $(y_{2i+1}, y_{2i}, y_{2i-1})$ (i: an integer equal to or larger than 0) of three bits in total including each set and a most significant bit of each low-order set, selects the group sequentially and adds or subtracts the first group and second group. The specific combination is a combination in which the highest-order bit of each of the first group and the second group is the same value, and the third least significant bit obtained after the subtraction operation is 1.

According to another exemplary embodiment of the present invention, there is provided motion-compensating device that generates a predicted image includes a first filter operation section that filters input data in a vertical direction, a second filter operation section that filters the input data in a horizontal direction, and a weighting operation section that weights one of an operation result of each of the first filter operation section and the second filter operation section, and the input data input to each of the first filter operation section and the second filter operation section.

The first filter operation section and the second filter operation section each includes a Booth's encoder that encodes the operation result according to Booth's algorithm, and generates code data, a partial product generation unit that calculates a partial product from the code data as a first partial product, and calculates, in a case where the first group and the second group are specific combination, a second partial product, and an adder that cumulatively adds an output from the partial product generation unit. The operation unit divides the input data into sets of two bits from a least significant bit, forms the first group and second group ($y_{2i+1}$, $y_{2i}$, $y_{2i-1}$) (i: an integer equal to or larger than 0) of three bits in total including each set and a most significant bit of each low-order set, selects the group sequentially and adds or subtracts the first group and second group. The specific combination is a combination in which the highest-order bit of each of the first group and the second group is the same value, and the third least significant bit obtained after the subtraction operation is 1.

According to exemplary embodiments of the present invention, the second partial product is generated only in the combination in which the high-order one bit of each of the first group and the second group is 0 or 1 and the least significant third bit obtained after the operation of addition or subtraction is 1. Thus, it is possible to generate a partial product in which the first partial product obtained using a typical method is added to the second partial product and input data is divided into sets of three bits. Consequently, it is possible to reduce the circuit size of a subtractor for use in carrying out an operation for obtaining a difference between previous data and next data.

According to exemplary embodiments of the present invention, it is possible to provide a multiplier and a motion-compensating device which are capable of reducing the amount of hardware and power consumption by using Booth's algorithm.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 10 is a truth table for a carry bit calculation section 50;

DETAILED DESCRIPTION OF THE EXEMPLARY EMBODIMENTS

Hereinafter, specific embodiments to which the present invention is applied will be described in detail with reference to the drawings. An exemplary embodiment of the present invention is a filter operation unit utilizing Booth's algorithm. The filter operation unit according to an exemplary embodiment of the present invention permits a reduction in size of the operation unit by carrying out subtraction of bits encoded by a Booth encoder, when a difference between neighboring pixels is obtained by using characteristics of an image in a device in which the circuit size is reduced by utilizing the fact that a difference between pixel values of neighboring pixels (current data and previous data) is small. Note that, according to exemplary embodiments of the present invention, a description is made assuming that subtraction between previous data and next data is carried out. Exemplary embodiments of the present invention can also be applied to the case where previous data and next data are added together, as described later.

First, a description is given of an image decoding device to which a filter operation unit according to an exemplary embodiment of the present invention can be applied. In this case, a filter operation unit that carries out a filter operation during motion compensation processing for H.264 and VC-1 is described by way of example. Note that a motion compensation circuit capable of performing a filter operation in compliance with the H.264 and VC-1 standards is herein described. Exemplary embodiments of the present invention can also be applied to filter operation units including a motion compensation circuit that performs a filter operation of H.264, a motion compensation circuit that performs a filter operation of VC-1, and other moving picture experts groups (MPEGs) 2 and 4.

Figure 1:
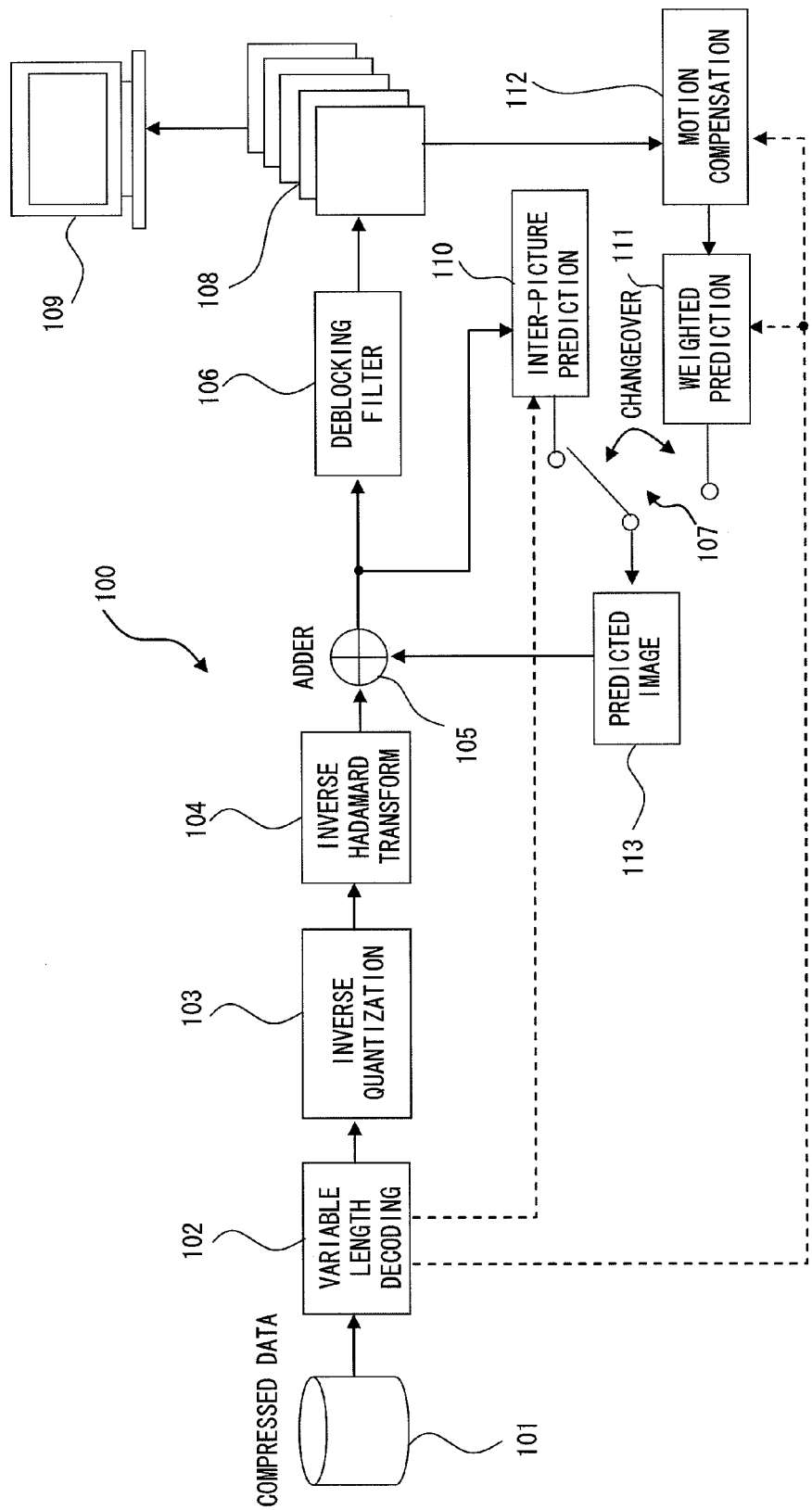
FIG. 1 is a block diagram illustrating a decoding device that decodes a compressed image encoded in accordance with H.264.
Figure 2:
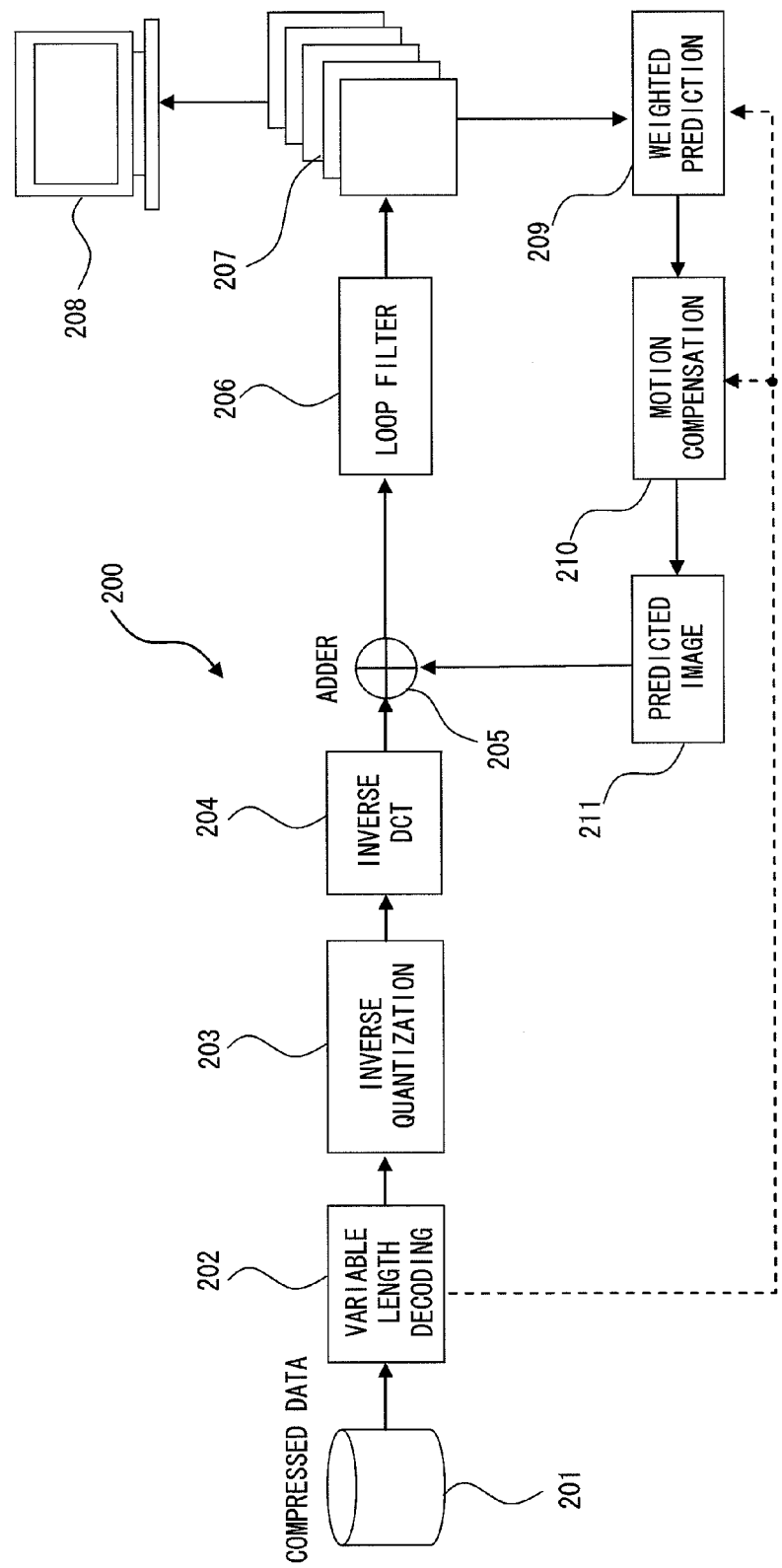
FIG. 2 is a block diagram illustrating a decoding device that decodes a compressed image encoded in accordance with VC-1.

An image decoding device compliant with the H.264 and VC-1 standards is first described below. FIGS. 1 and 2 are block diagrams each showing a decoding device that decodes a compressed image encoded in compliance with the H.264 and VC-1 standards. H.264 is also referred to as MPEG-4 Advanced Video Coding (AVC), which is a compression coding system with a data compression rate more than twice that of MPEG-2 and more than 1.5 times that of MPEG-4. Further, VC-1 (Windows Media Video (WMV) 9®), which is a moving picture compression technology developed by Microsoft Corporation, has a data compression rate equivalent to that of H.264. These advanced codecs (high-compression codecs) are applied to next-generation DVD standards such as a Blu-ray Disc.

As shown in FIG. 1, an image decoding device 100 compliant with H.264 includes a variable length decoding section 102, an inverse quantization section 103, an inverse Hadamard transform section 104, an adder 105, a deblocking filter 106, a motion-compensating section 112, a weighted prediction section 111, an inter-picture prediction section 110, and a monitor 109 that displays a decoded image 108.

The variable length decoding section 102 receives compressed data 101 and performs variable length decoding of the compressed data subjected to variable length coding, based on a conversion table. The decoded data subjected to variable length decoding is inversely quantized in the inverse quantization section 103. Then, the data is subjected to inverse Hadamard transform in the inverse Hadamard transform section 104 and is sent to the adder 105. Block distortion of the output from the adder 105 is removed by the deblocking filter 106 to thereby obtain the decoded data image 108 displayed on the monitor 109.

In this case, the output of the adder 105 is also input to the inter-picture prediction section 110 to generate a predicted image 113. The decoded image is subjected to motion compensation processing in the motion-compensating section 112 and is weighted in the weighted prediction section 111 to thereby generate the predicted image 113. In the case of I-frame processing, the adder 105 adds a prediction error to the predicted image 113 sent from the inter-picture prediction section 110 and outputs the addition result. Meanwhile, in the case of P-frame or B-frame processing, switching is performed in the switching section 107 and the prediction error is added to the predicted image 113 sent from the weighted prediction section 111, and the addition result is then output.

Further, as shown in FIG. 2, an image decoding device 200 compliant with VC-1 is configured in a similar manner as the image decoding device 100. The image decoding device 200 includes a variable length decoding section 202, an inverse quantization section 203, an inverse DCT section 204, an adder 205, a loop filter 206, a weighted prediction section 209, a motion-compensating section 210, and a monitor 208 that displays a decoded image 207. The image decoding device 200 compliant with VC-1 is different from the image decoding device 100 in that, in the image decoding device 200, the inter-picture prediction is not performed and the motion compensation processing is carried out after the weighted prediction, and the loop filter 206 is used instead of the deblocking filter 106.

Figure 3:
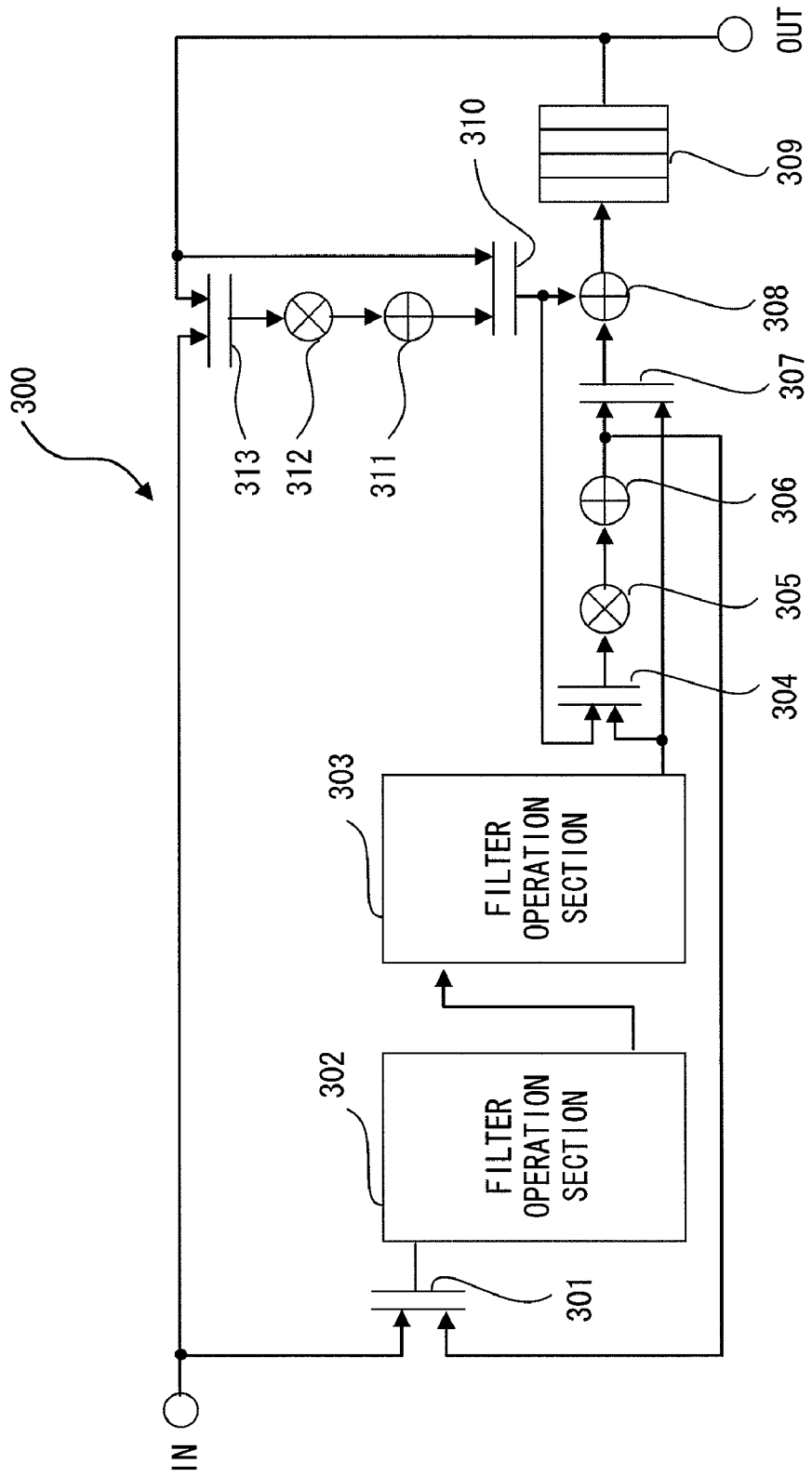
FIG. 3 is a block diagram illustrating a motion-compensating (MC) section that performs motion compensation processing including a filter operation compliant with H.264 and VC-1.

FIG. 3 is a block diagram illustrating a motion-compensating (MC) section according to an exemplary embodiment of the invention that performs motion compensation processing including a filter operation in compliance with the H.264 and VC-1 standards. A motion-compensating section 300 can be used as the motion-compensating section compliant with H.264 and also as the motion-compensating section compliant with VC-1. In other words, the motion-compensating section 300 meets both the H.264 and VC-1 standards. The motion-compensating section 300 includes filter operation sections 302 and 303, selectors 301, 304, 307, 310, and 313, multipliers 305 and 312, adders 306, 308, and 311, and a line memory 309.

In the H.264 standard, a filter operation is performed in each of the filter operation sections 302 and 303, and then a weighted interpolation signal with an offset is obtained using the weighting coefficients to thereby obtain a predicted image 211. In this case, pixel values of a reference picture R0 input from an input IN are subjected to a filter operation by a vertical-direction filter in the filter operation section 302 and are further subjected to a filter operation by a horizontal-direction filter in the filter operation section 303. Then, the data generated through the filter operations is stored in the line memory 309. Next, pixel values of a reference picture R1 are input from the input IN, and the pixel values are then subjected to the filter operations in the filter operation sections 302 and 303 in the same manner as described above. The data obtained through the filter operations is multiplied by a weighting factor in the multiplier 305, and an offset value is added to the multiplication result by the adder 306. Meanwhile, the data stored in the line memory 309 passes through the selector 313 and is multiplied by each weighting coefficient by the multiplier 312. Then, the obtained values are added together by the adder 308 to thereby generate a weighted interpolation signal with an offset $W_0 X_0 + W_1 X_1 + D$. The generated data is output from an output OUT via the line memory 309.

In the VC-1 standard, data input from the input IN is input to the filter operation sections 302 and 303 via the selectors 313 and 310 and via the selector 304, the multiplier 305, the adder 306, and the selector 301. The result obtained by the filter operation section 303 is stored as it is in the line memory 309 via the selectors 304 and 307 and output from the output OUT. The multiplier 312, the adder 311, the multiplier 305, and the adder 306 perform a weighting operation according to the equation $$H = (iScale \times F + iShift + 32) >> 6$$

where F represents an input value, and iScale and iShift each represent a weighting factor.

The motion-compensating section 300 configured as described above appropriately selects the input/output of the filter operation sections 302 and 303 in the selectors 301, 304, 307, 310, and 313. Accordingly, the motion-compensating section 300 can be applied to the operation for the H.264 standard in which the weighting operation is performed after the filter operation, and also to the operation for the VC-1 standard in which the weighting operation is performed before the filter operation.

Figure 4:
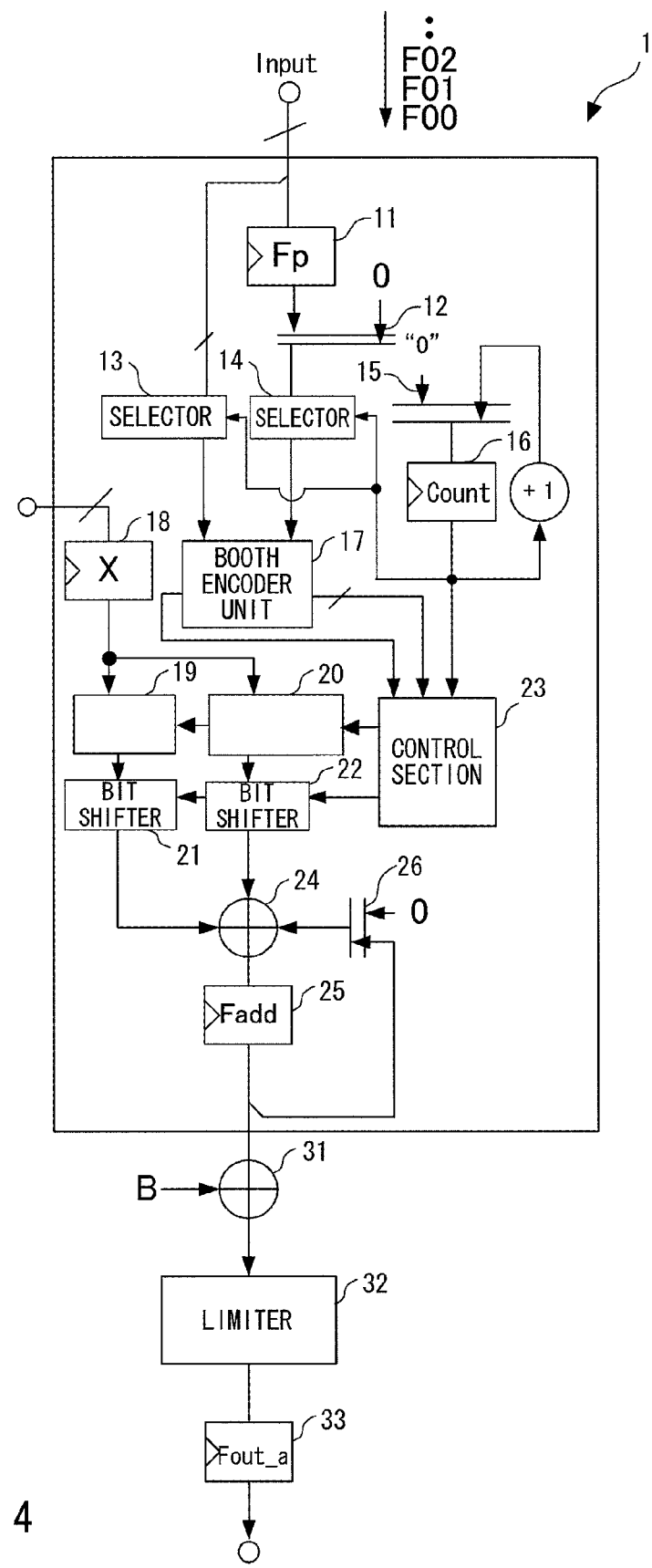
FIG. 4 is a block diagram illustrating a filter operation unit according to an exemplary embodiment of the present invention.

Next, a filter operation section according to an exemplary embodiment of the invention that can be used in the motion-compensating section and the like is described in detail below. Though the H.264 and VC-1 standards are described above as examples, the filter operation unit according to an exemplary embodiment of the present invention can also be used as a filter operation section for MPEG-4, MPEG-2, and the like. FIG. 4 shows a block diagram of details of the filter operation sections 302 and 303, and also shows a filter operation unit according to an exemplary embodiment of the present invention. The filter operation sections 302 and 303 have the same configuration. A filter operation unit 1 shown in FIG. 4 includes a filter multiplier unit 10, an adder 31, a limiter circuit 32, and a flip-flop 33. Though FIG. 4 shows a single filter multiplier unit, the number of filter multiplier units is not limited to one, and any number of filter multiplier units may be provided depending on the number of filter coefficients. Table 1 below shows filter coefficients for a luminance signal Gy and a color difference signal Gc in each of the H.264 and VC-1 standards.

TABLE 1

| | H.264 | | VC-1 | |
| | Gy | Gc | Gy | Gc |
|---|---|---|---|---|
| 1 | 1 | — | — | — |
| 2 | −5 | — | −4 | −1 | −3 | — |
| 3 | 20 | 0-8 | 53 | 9 | 18 | 0-4 |
| 4 | 20 | 8-0 | 18 | 9 | 53 | 4-0 |
| 5 | −5 | — | −3 | −1 | −4 | — |
| 6 | 1 | — | — | — |

As shown in Table 1, in the H.264 standard, the luminance signal Gy is subjected a 6-tap filter operation, and the color difference signal Gc is subjected to a 2-tap filter operation. In the VC-1 standard, the luminance signal Gy is subjected to a 4-tap filter operation, and the color difference signal Gc is subjected to a 2-tap filter operation. Accordingly, the filter operation unit 1 shown in FIG. 4 includes six filter multiplier units, for example. Note that the operation may be repeatedly performed using a single filter multiplier unit.

In this case, the filter operation unit according to an exemplary embodiment of the present invention is a filter operation unit that performs multiplication using Booth's algorithm. To facilitate the understanding of the filter operation unit according to an exemplary embodiment of the present invention, the multiplier using the secondary Booth's algorithm is first described below.

Assuming that a multiplier Y is a signed 8-bit integer given by $$Y = -y[7]\cdot 2^7 + y[6]\cdot 2^6 + y[5]\cdot 2^5 + y[4]\cdot 2^4 + y[3]\cdot 2^3 + y[2]\cdot 2^2 + y[1]\cdot 2^1 + y[0]\cdot 2^0,$$

a product of the multiplier Y and a multiplicand X which is an arbitrary integer, that is, P=X×Y can be expressed as follows.

[Equation 1]

$$\begin{aligned}
P &= X \times Y \quad (1)\\
&= X \times (-y[7]\cdot 2^7 + y[6]\cdot 2^6 + y[5]\cdot 2^5 + y[4]\cdot 2^4 + y[3]\cdot 2^3 + \\
&\quad y[2]\cdot 2^2 + y[1]\cdot 2^1 + y[0]\cdot 2^0)\\
&= X \times \{(-y[7]\cdot 2^7 + y[6]\cdot 2^6 + 2\cdot y[5]\cdot 2^5) + (-y[5]\cdot 2^5 + \\
&\quad y[4]\cdot 2^4 + 2\cdot y[3]\cdot 2^3) + (-y[3]\cdot 2^3 + y[2]\cdot 2^2 + \\
&\quad 2\cdot y[1]\cdot 2^1) + (-y[1]\cdot 2^1 + y[0]\cdot 2^0 + 2\cdot 0 \cdot 2^0)\}\\
&= X \times \{(-2\cdot y[7] + y[6] + y[5])\cdot 2^6 + (-2\cdot y[5] + y[4] + \\
&\quad y[3])\cdot 2^4 + (-2\cdot y[3] + y[2] + y[1])\cdot 2^2 + (-2\cdot y[1] + \\
&\quad y[0] + 0)\cdot 2^0\}\\
&= \sum_{i=0}^{\frac{n}{2}-1} (-2\cdot y[2i+1] + y[2i] + y[2i-1])\cdot X\cdot 2^{2i}
\end{aligned}$$

Where y[−1]=0

A unit that calculates (−2·y[2i+1]+y[2i]+y[2i−1]) is referred to as a Booth encoder, and X×(−2·y[2i+1]+y[2i]+y[2i−1])×2^{2i} is referred to as a partial product. An encode value (−2·y[2i+1]+y[2i]+y[2i−1]) obtained by the Booth encoder is herein referred to as code data. Further, a circuit that generates the partial product X×(−2·y[2i+1]+y[2i]+y[2i−1])×2^{2i} is referred to as a partial product generation unit. A circuit that obtains the code data (−2·y[2i+1]+y[2i]+y[2i−1]) of the partial product X×(−2·y[2i+1]+y[2i]+y[2i−1])×2^{2i} is referred to as a Booth encoder. A circuit that performs an operation including multiplication of the code data and the multiplicand so as to obtain the partial product is referred to as a multiplication section. A section that performs an operation of ×2^{2i} of the partial product is referred to as a bit shifter. A circuit that includes the multiplication section and the bit shifter and that generates the partial product corresponding to each value "i" is referred to as a partial product generator.

As shown in Table 2 below, the code data (−2·y[2i+1]+y[2i]+y[2i−1]) takes eight combinations of values of 0, ±1, and ±2. Accordingly, the multipliers each can be expressed as a correspondence (truth table) between combinations of values (partial products) obtained by calculating values (partial products) by multiplying each of 0, ±X, and ±2X by $2^{2i}$ and adding the multiplication results. Since the code data takes only eight combinations of values, according to an exemplary embodiment of the invention, the Booth encoder can be formed of a combination of logic circuits.

TABLE 2

| y[2i+1] | y[2i] | y[2i−1] | OUTPUT OF BOOTH ENCODER (−2·y[2i+1]+y[2i]+y[2i−1]) | OUTPUT OF PARTIAL PRODUCT GENERATOR |
|---|---|---|---|---|
| 0 | 0 | 0 | 0 | 0 |
| 0 | 0 | 1 | 1 | +X |
| 0 | 1 | 0 | 1 | +X |
| 0 | 1 | 1 | 2 | +2X |
| 1 | 0 | 0 | −2 | −2X |
| 1 | 0 | 1 | −1 | −X |
| 1 | 1 | 0 | −1 | −X |
| 1 | 1 | 1 | 0 | 0 |

Among values 0, ±X, and ±2X, the value 2X can be generated by one-bit shift. On the other hand, a negative value can be generated by inverting each bit of the value X and adding 1 to the least significant bit since the multiplicand X is represented by the two's complement. To realize this, for example, a circuit (Booth encoder) that generates the code data (−2·y[2i+1]+y[2i]+y[2i−1]) generates three signals including two signals for selecting absolute values (0, X, and 2X) of the partial product and one signal for selecting the inversion in response to the input of the multiplier Y. Upon reception of the three signals, the multiplication section selects 0 when the absolute value is 0, selects the multiplicand X when the absolute value is X, and selects the multiplicand X shifted by one bit when the absolute value is 2X. Further, the value is inverted if the inversion is necessary, thereby enabling generation of the partial product. The bit shifter that executes ×2^{2i} may simply shift a bit line only by 2i.

Figure 5:
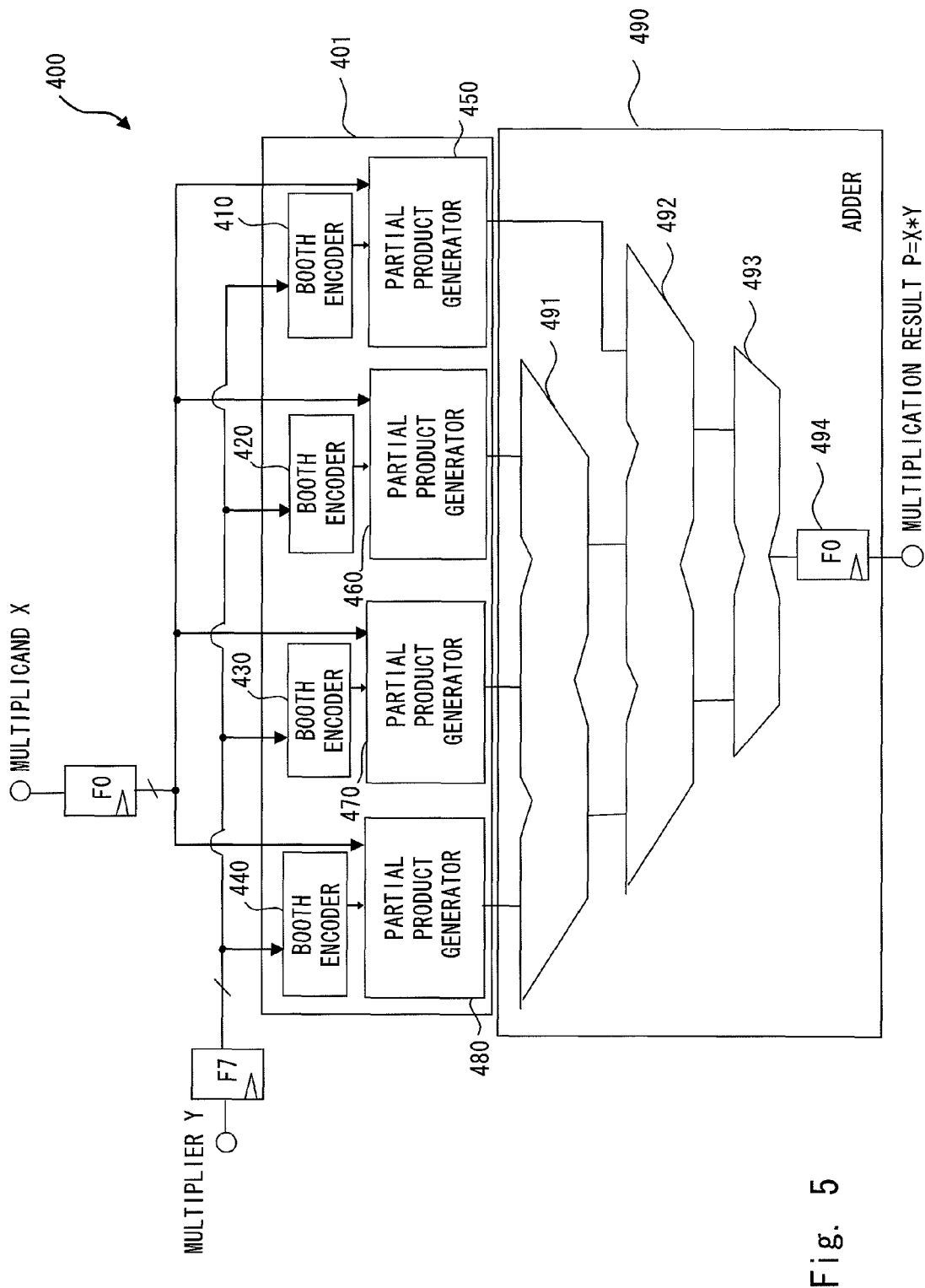
FIG. 5 is a block diagram illustrating a multiplier that performs multiplication according to a secondary Booth's algorithm.

FIG. 5 is a block diagram illustrating a multiplier according to an exemplary embodiment of the invention that performs multiplication according to the secondary Booth's algorithm. A multiplier 400 includes a register F0 that outputs the multiplicand X, and a register F7 that outputs the multiplier Y. The multiplier 400 further includes a partial product generation unit 401 that receives the multiplier Y and the multiplicand X and generates partial products, and an adder 490 that adds the partial products generated by the partial product generation unit 401. The partial product generation unit 401 includes four Booth encoders 410, 420, 430, and 440 and four partial product generators 450, 460, 470, and 480.

As described above, each of the Booth encoders 410, 420, 430, and 440 receives predetermined bits of the multiplier Y and generates code data (0, ±1, ±2) according to Booth's algorithm.

Each of the partial product generators 450, 460, 470, and 480 includes a multiplication section that receives the multiplicand X and outputs a multiplication result of the code data obtained by the Booth encoder and the multiplicand X, and includes a bit shifter that performs bit shift of the operation result of the multiplication section.

Each of the Booth encoders 410, 420, 430, and 440 and each of the partial product generators 450, 460, 470, and 480 correspond to "i" of X×(−2·y[2i+1]+y[2i]+y[2i−1])×$2^{2i}$. For example, in the case of 8-bit multiplier Y ($y_0$ to $y_7$) "i" is in a range of 0 to 3. In this case, (−2·$y_1$+$y_0$+0), (−2·$y_3$+$y_2$+$y_1$), (−2·$y_5$+$y_4$+$y_3$), (−2·$y_7$+$y_6$+$y_5$), X×(−2·$y_1$+$y_0$+0)×$2^0$, X×(−2·$y_3$+$y_2$+$y_1$)×$2^2$, X×(−2·$y_5$+$y_4$+$y_3$)×$2^4$, and X×(−2·$y_7$+$y_6$+$y_5$)×$2^6$ are calculated. Referring to FIG. 5, the partial product generators 450, 460, 470, and 480 calculate those partial products. Note that, according to an exemplary embodiment of the present invention, the 8-bit multiplier Y that is encoded by the Booth encoders is illustrated, but multipliers smaller or larger than the 8-bit multiplier can also be used. In this case, the number of the partial product generators may be arbitrarily set.

Figure 6A:
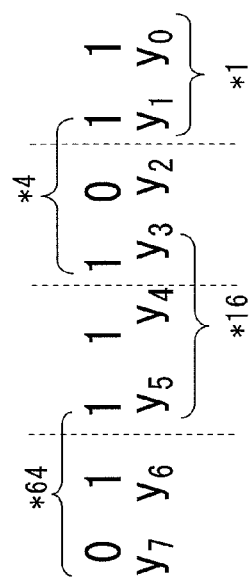
FIG. 6A is a diagram illustrating bits for use in generation of code data according to Booth's algorithm.
Figure 6B:
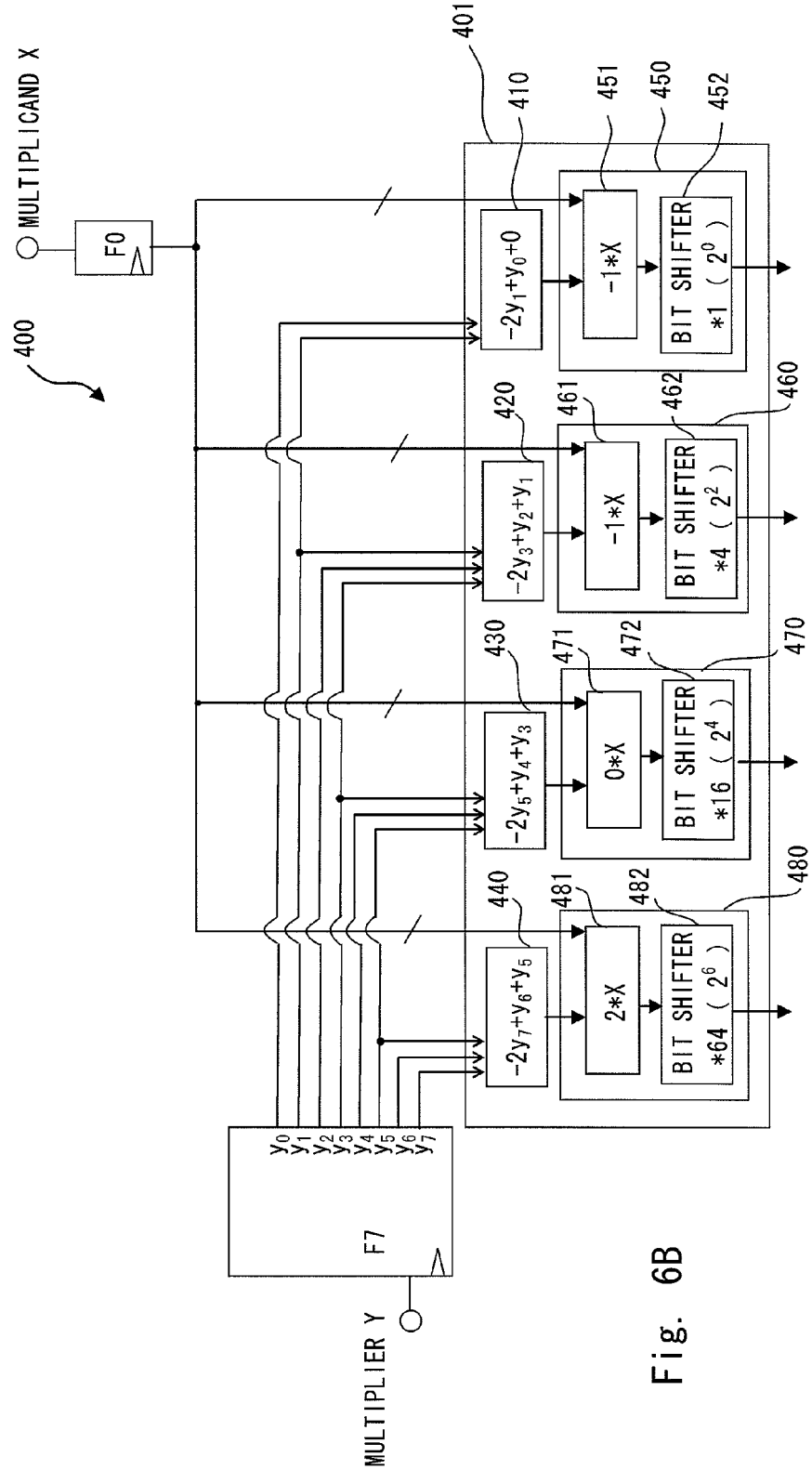
FIG. 6B is a diagram illustrating details of a partial product generation unit of a multiplier shown in FIG. 1.

Next, the operation of the multiplier 400 will be described by illustrating a practical operation. FIG. 6A shows an exemplary embodiment of the 8-bit multiplier Y. The multiplier is divided into sets of two bits to form groups of three bits in total (where $y_{−1}$=0) including two bits of each set and a most significant bit of a low-order set, thereby obtaining code data. A partial product can be generated by multiplying the code data by the multiplicand X and calculating a corresponding bit shift (×$2^i$). Referring to FIG. 6B, the register F7 is formed of a shift register that outputs 8-bit data and outputs the multiplier Y {$y_0$ to $y_7$}. In this case, the low-order two bits {$y_0$, $y_1$} of the multiplier Y are input to the Booth encoder 410, and {$y_1$, $y_2$, $y_3$}, {$y_3$, $y_4$, $y_5$}, and {$y_5$, $y_6$, $y_7$} are input to the Booth encoders 420, 430, and 440, respectively. The Booth encoder 410 generates code data from the received predetermined bits. The code data thus obtained is input to the corresponding partial product generators 450, 460, 470, and 480. The partial product generators 450, 460, 470, and 480 include multiplication sections 451, 461, 471, and 481, respectively, for multiplying the obtained code data by the multiplicand X, and also include bit shifters 452, 462, 472, and 482, respectively, for shifting the multiplication result by predetermined bits. In this case, the multiplication of a multiplicand X=358 (166 H) and a multiplier Y=123 (7 BH) is described. Table 3 below shows output values used in the operation process.

TABLE 3

| No | CODE DATA y[2i + 1] | CODE DATA y[2i] | CODE DATA y[2i − 1] | BOOTH ENCODER (−2 · y[2i + 1] + y[2i] + y[2i − 1]) |
|---|---|---|---|---|
| 1 | 0 | 1 | 1 | 2 |
| 2 | 1 | 1 | 1 | 0 |
| 3 | 1 | 0 | 1 | −1 |
| 4 | 1 | 1 | 0 | −1 |
| 5 | | | | |

| No | PARTIAL PRODUCT GENERATOR | OUTPUT OF PARTIAL PRODUCT GENERATOR | OPERATION OF ADDER |
|---|---|---|---|
| 1 | 411 | 2 · X = 02CC H | B300 H |
| 2 | 421 | 0 · X = 0000 H | 0000 H |
| 3 | 431 | −1 · X = FE9A H | FD68 H |
| 4 | 441 | −1 · X = FE9A H | FE9A H |
| 5 | | SUM | AC02 H |

TABLE 3-continued

Provided that $$X \times Y = 358 \times 123 = 440034 \ (AC02H)$$

$$Y = 123 \ (7BH)$$
$$= (-2 \cdot 0 + 1 + 1) \cdot 2^6 + (-2 \cdot 1 + 1 + 1) \cdot 2^4 +$$
$$(-2 \cdot 1 + 0 + 1) \cdot 2^2 + (-2 \cdot 1 + 1 + 0) \cdot 2^0$$
$$= 2 \cdot 2^6 + 0 \cdot 2^4 + (-1) \cdot 2^2 + (-1) \cdot 2^0,$$

the following calculations are performed.

$X \times Y = \{(2 \times 358) \times 2^6\}$ generator 450 + ... calculated by the partial product $\{(0 \times 358) \times 2^4\}$ generator 460 − ... calculated by the partial product $\{(-1 \times 358) \times 2^2\}$ generator 470 + ... calculated by the partial product $\{(-1 \times 358) \times 2^0\}$ generator 480 ... calculated by the partial product First, "358" is input to each of the partial product generators 450, 460, 470, and 480 from the multiplicand input section F0. Then, from the multiplier input section F7, {$y_0$, $y_1$}={1, 1}, {$y_1$, $y_2$, $y_3$}={1, 0, 1}, {$y_3$, $y_4$, $y_5$}={1, 1, 1}, and {$y_5$, $y_6$, $y_7$}={1, 1, 0} are input to the Booth encoders 410, 420, 430, and 440, respectively. The Booth encoders 410, 420, 430, and 440 output code data corresponding to the operations of (−2·y[2i+1]+y[2i]+y[2i−1])=(−2·$y_1$+$y_0$+0), (−2·$y_3$+$y_2$+$y_1$), (−2·$y_5$+$y_4$+$y_3$), and (−2·$y_7$+$y_6$+$y_5$), respectively, from the input predetermined bits. From the above equation, the Booth encoders 410, 420, 430, and 440 output "−1", "−1", "0", and "2", respectively, in this example.

The multiplication sections 451, 461, 471, and 481 perform multiplication of the code data and the multiplicand X, and input the obtained results to the bit shifters 452, 462, 472, and 482, respectively. The bit shifter 452 outputs the obtained result directly to the adder 490. Note that the bit shifter 452 that performs one-bit shift is provided for clarity in this example, but it is not necessary to provide the bit shifter 452. The bit shifters 462, 472, and 482 shift the obtained results by two bits, four bits, and 6 bits, respectively, and input the obtained values to the adder 490.

The adder 490 according to this exemplary embodiment includes full adders 491 and 492, a half adder 493, and a register 494 that receives a result. Values input from the partial product generators 450, 460, 470, and 480 are added together by the adder 490 and output as a multiplication result P.

When the secondary Booth's algorithm is used in this manner, the multiplier is represented by the code data of 0, ±1, and ±2 multiplied by $2^{2i}$ and the result is multiplied by the multiplicand. As a result, the number of partial products is reduced by about half. Accordingly, the number of partial products to be added by the adder can be reduced by about half, which results in a reduction in size of the multiplier.

Figure 7:
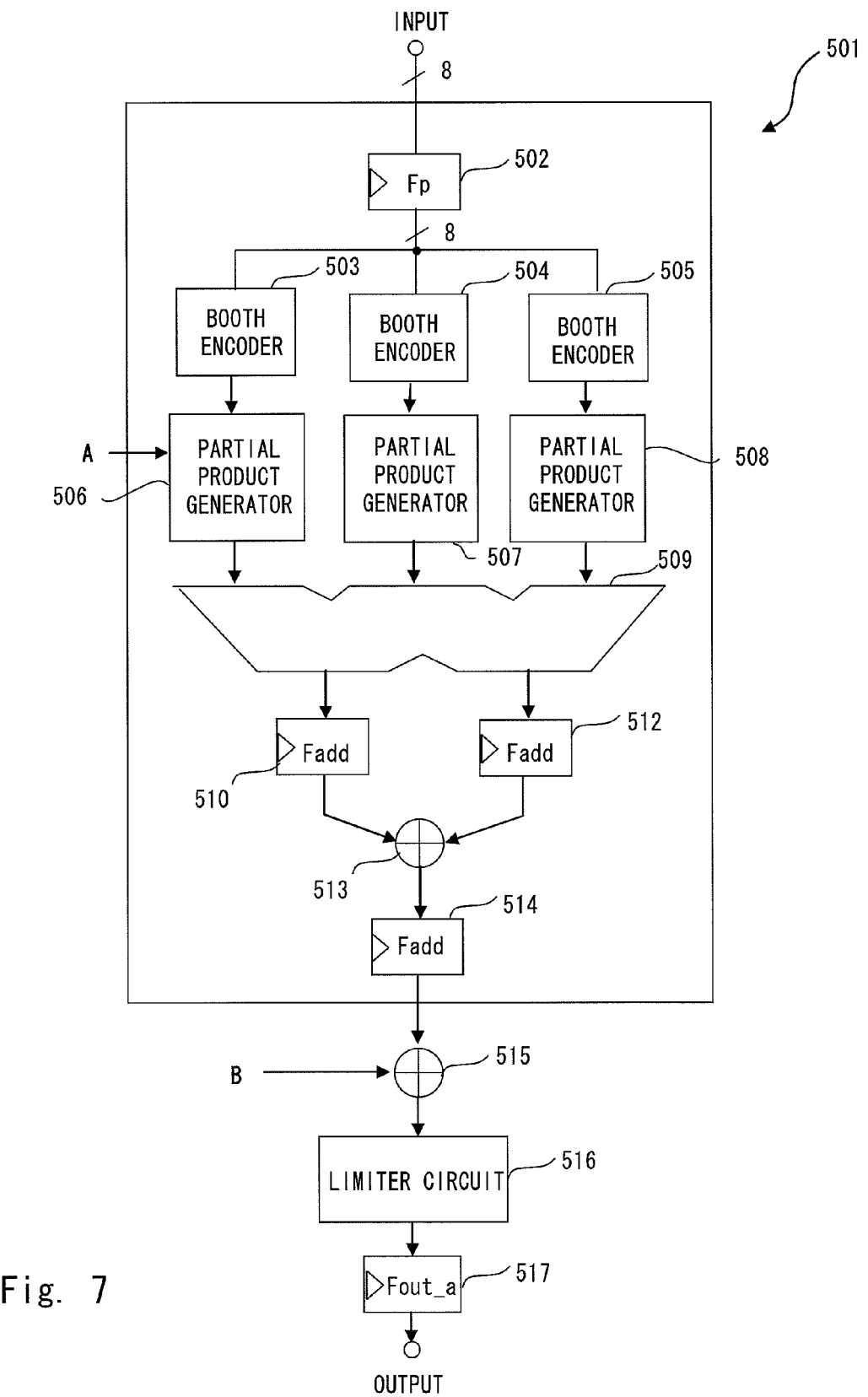
FIG. 7 is a diagram illustrating a filter operation unit according to the related art.

When the partial product generation unit configured as described above is employed, according to an exemplary embodiment of the invention, the filter operation unit is configured as an arithmetic circuit shown in FIG. 7. FIG. 7 is a diagram illustrating the filter operation unit having the conventional configuration. Specifically, as described above, in the case of 8-bit data, for example, it is necessary to provide four partial product generators. In the case of 10-bit data, for example, it is necessary to provide five partial product generators. Note that FIG. 7 shows only three partial product generators for ease of explanation.

Briefly referring to FIG. 7, a filter operation unit 501 includes registers (flip-flops: FFs) 502, 510, 512, 514, and 517, Booth encoders 503 to 505, partial product generators 506 to 508, adders 509, 513, and 515, and a limiter circuit 516. Pixel data is input as the multiplier Y and held in the FF 502. The value of the pixel data is input from the FF 502 to the Booth encoders 503 to 505, which are provided corresponding to the number of bits, to thereby generate code data. The code data is input to the corresponding partial product generators 506 to 508 to generate partial products. The adder 509 adds the partial products and inputs high-order bits and low-order bits of the addition result to the FF 510 and the FF 512, respectively. The adder 513 adds a value output from the FF 510 and a value output from the FF 512, and outputs the addition result to the FF 514. The adder 515 adds a value output from the FF 514 and a filter coefficient B, and the limiter circuit 516 limits the value of the adder 515 within a range of 0 to 255, for example, and outputs the limited value to the FF 517.

The filter operation unit executes the following operation:

[output pixel]=Lim([input pixel]×$A+B$)

where A represents a filter coefficient, and B represents a predetermined constant that is added in each filter operation, if necessary. In the conventional filter operation unit, data read from an external memory or the like is read in a burst manner. In this case, a high-speed operation is generally performed by a pipeline process using a large-scale multiplier. Accordingly, in the case of 10-bit pixel data, for example, it is necessary to provide five partial product generators, which increases the circuit size and power consumption.

Figure 8:
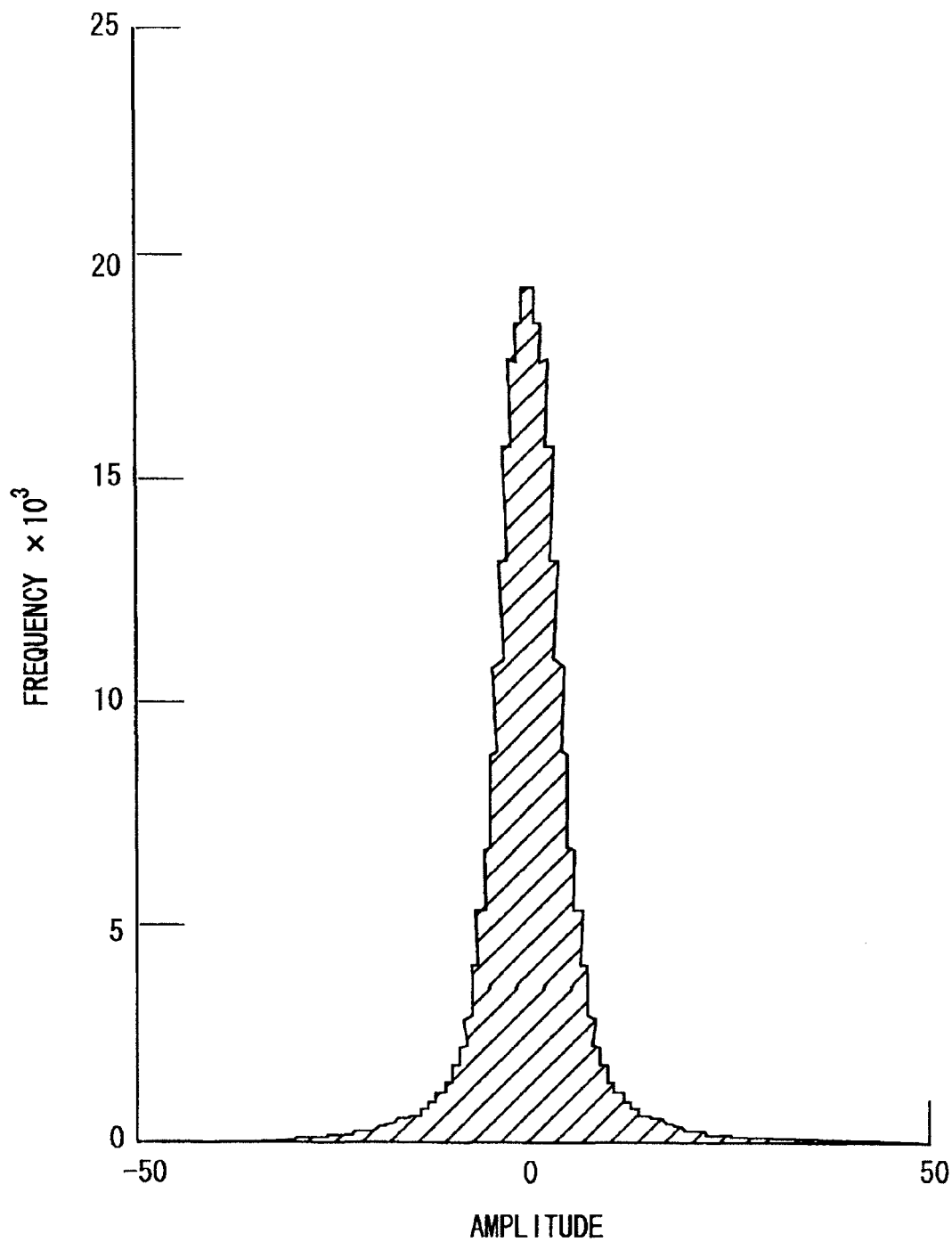
FIG. 8 is a graph showing an amplitude distribution of a difference signal between pixels adjacent to each other in a horizontal direction with respect to an image.

In this exemplary embodiment, a single partial product generator is used instead of the partial product generators 506 to 508 shown in FIG. 7, and the one partial product generation unit is repeated used, thereby reducing the circuit size and power consumption. Furthermore, when difference data between pixel values adjacent to each other is used, a small calculated value is obtained, which leads to a further reduction in arithmetic processing time. The reason for this is described below. FIG. 8 is a graph showing an amplitude distribution of a difference signal between pixels adjacent to each other in the horizontal direction with respect to an image ("Image Information Compression", The Journal of the Institute of Television Engineers of Japan, P. 71). An axis of abscissa represents an amplitude, and an axis of ordinate represents a frequency. The difference signal is centered in a narrow range around 0. Accordingly, a difference signal is generated by a subtractor so as to obtain a value close to 0. By setting the input data to the value close to 0 as the difference data, the number of multiplications to be performed by the partial product generator can be minimized, and the arithmetic processing time can be reduced.

When the input data is subjected to subtraction between the previous data and the next data, it is necessary to provide a subtractor corresponding to the bit width of the input data. The subtractor has a large circuit size. Accordingly, according to an exemplary embodiment of the present invention, the subtractor is downsized.

Figure 9:
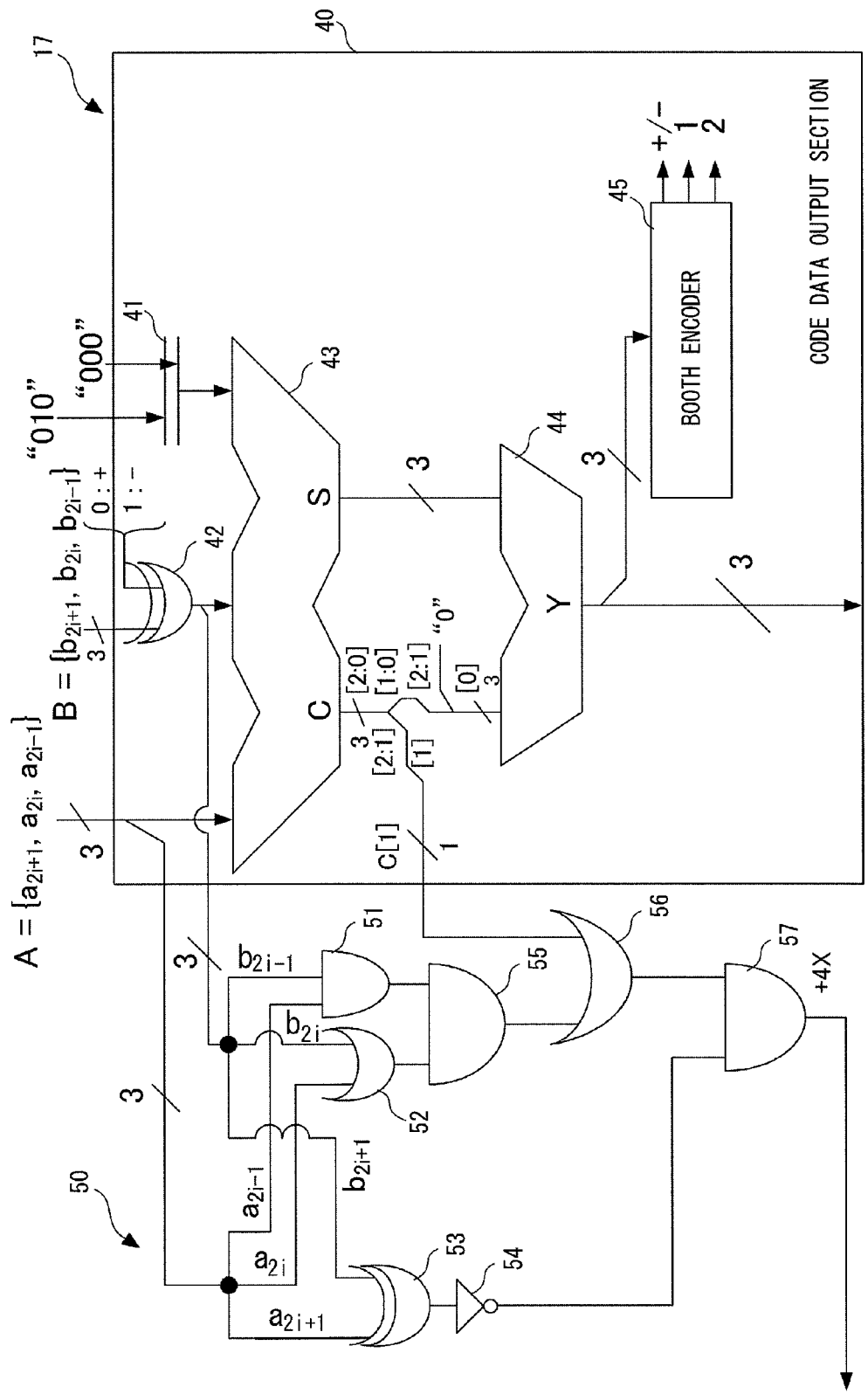
FIG. 9 is a diagram illustrating details of a Booth encoder unit 17 included in a filter multiplier unit 10 shown in FIG. 4.

Hereinafter, the filter multiplier unit 10 according to an exemplary embodiment of the present invention will be described in more detail. FIG. 9 is a diagram illustrating details of a Booth encoder unit 17 included in the filter multiplier unit 10 shown in FIG. 4. Referring to FIGS. 4 and 9, the filter multiplier unit 10 includes: adders (43 and 44) each serving as an operation unit that performs addition or subtraction between a first group selected in the current input data, and a second group selected at a position corresponding to the first group in the next input data; a Booth encoder 45 that encodes the operation result of each of the operation units according to Booth's algorithm and generates encode data; partial product generation units (19, 20, 21, and 22) that calculate a partial product as a first partial product from the code data, and also calculate a second partial product that is generated only in the presence of a predetermined combination of the first group and the second group; and an adder 24 that cumulatively adds outputs from the partial product generation units.

The adders 43 and 44 together with an EXOR circuit 42 divide the input data into sets of two bits from a least significant bit, forms the group of three bits in total including each set and a most significant bit of each low-order set, that is, ($y_{2i+1}$, $y_{2i}$, $y_{2i-1}$) (i: an integer equal to or larger than 0), and the groups are sequentially selected and subtraction is performed. As described above, the Booth encoder 45 generates code data by calculating $-2 \cdot y_{2i+1}+y_{2i}+y_{2i-1}$. Each partial product generation unit includes a first partial product generator that generates the first partial product, and a second partial product generator that generates the second partial product. The first partial product generator includes the multiplication section 20 and the bit shifter 22, and the second partial product generator includes the multiplication section 19 and the bit shifter 21. The above-mentioned combination is a combination in which the highest-order bit of each of the first group and the second group is 0 or 1, and the third least significant bit obtained after the subtraction operation is 1. The first partial product generator generates the first partial product from code data $\times X \times 2^i$, and the second partial product generator generates the second partial product from $4 \times X \times 2^i$ only in the presence of the predetermined combination.

The filter multiplier unit 10 includes not only the Booth encoder unit 17, the multiplication sections 19 and 20, the bit shifters 21 and 22, and the adder 24, but also selectors 13 to 15, a control section 23, a register 18, a selector 26, and an FF 25.

An FF 11 is a register that holds input data for a predetermined period of time to obtain a difference with the next input data. The selector 13 selects a first group {$a_{2i+1}$, $a_{2i}$, $a_{2i-1}$} from the previous input data, and the selector 14 selects a second group {$b_{2i+1}$, $b_{2i}$, $b_{2i-1}$} from the next input data. Upon reception of input data {$a_0$, $a_1$, $a_2$, $a_3$, $a_4$, $a_5$, $a_6$, $a_7$}, for example, the selector 13 sequentially selects {$a_0$, $a_1$}, {$a_1$, $a_2$, $a_3$}, {$a_3$, $a_4$, $a_5$}, and {$a_5$, $a_6$, $a_7$} as the first group. Upon reception of input data {$b_0$, $b_1$, $b_2$, $b_3$, $b_4$, $b_5$, $b_6$, $b_7$}, for example, the selector 14 sequentially selects {$b_0$, $b_1$}, {$b_1$, $b_2$, $b_3$}, {$b_3$, $b_4$, $b_5$}, and {$b_5$, $b_6$, $b_7$} the second group. When data is newly input, a counter 16 indicates 0, which is selected by the selector 15, and in the other cases, the counter 16 is incremented every time the selectors 13 and 14 select data. The control section 23 refers to a counter value, and performs control so that the selectors 13 and 14 can sequentially select the first group and the second group.

The Booth encoder unit 17 outputs code data according to Booth's algorithm, and also outputs "1" in the presence of the predetermined combination of the first group and the second group. The Booth encoder unit 17 includes a code data output section 40 and a carry bit calculation section 50. The code data output section 40 includes the EXOR circuit 42, a selector 41, the adders 43 and 44, and the Booth encoder 45.

The code data output section 40 receives three bits (first group: A) selected from the current input data, and also receives three bits (second group: B) selected from the previous input data. The second group is input to one input of the EXOR circuit 42, and "1" is normally input to the other input thereof. Then, the EXOR circuit 42 outputs the second group obtained by inverting the second group B. Further, "1" is selected by the selector 41 and input. As a result, the adder 43 receives the inverted first group A and second group B and also receives "1". By adding these values together, a difference between the first group A and the second group B is obtained. Note that the filter multiplication unit can also be used as a typical multiplier as described later. Instead of obtaining the difference between the first group and the second group, the sum of the first group and the second group may be calculated. In this case, "0" may be input to the other input of the EXOR circuit.

The adder 43 receives the first group A and a second group B' (which is obtained by adding "010" to the inverted result of the second group B), and outputs operation results (sum S and carry C). Note that, in order to perform the subtraction with accuracy when the inverted result is added, "1" selected by the selector 41 is input to the remaining input of the three inputs. As for the first three bits, one bit "0" is added to the least significant bit of the two least significant bits ($\{a_0, a_1\}$, {inverted $b_0$, inverted $b_1$} in the above-mentioned example), according to Booth's algorithm, thereby obtaining $\{a_0, a_1, 0\}$, {inverted $b_0$, inverted $b_1$, 0}. Accordingly, "1" does not indicate "001" but indicates "010", and the second group B' indicates {inverted $b_0$, inverted $b_1$+1, 0}).

The adder 44 outputs the sum of the first group A and the second group B' (difference between the first group A and the second group B) based on the operation result of the adder 43. The output result is hereinafter referred to as "subtraction result Y". The subtraction result Y is input to the Booth encoder 45 and is also input to the control section 23. The Booth encoder 45 outputs code data (0, ±1, ±2) based on the subtraction result Y.

The control section 23 receives the subtraction result Y from the code data output section 40, and controls the operations of the multiplication section 20 and the bit shifter 22 based on the value of the subtraction result. In other words, when the subtraction result Y indicates (3 bits)=(111) or (000), it is not necessary to generate the partial product. Accordingly, the operations of the multiplication section 20 and the bit shifter 22 can be omitted. Meanwhile, when the code data indicates data other than (111) or (000), the multiplication section 20 and the bit shifter 22 execute the operation for code data $\times X \times 2^i$ by using the value of the register 18.

For example, as shown in FIG. 9, the carry bit calculation section 50 includes AND circuits 51, 55, and 57, OR circuits 52 and 56, an EXOR circuit 53, and an inverter 54. Outputs of the carry bit calculation section 50 corresponds to outputs of a circuit formed of the AND circuit 57. The output values of the carry bit calculation section 50 are shown in FIG. 10. FIG. 10 shows the truth table for the carry bit calculation section 50. The values of the first group A are shown in the longitudinal direction of the table, and the values of the second group B' are shown in the lateral direction of the table. The carry bit calculation section 50 is a circuit that outputs "1" only when the high-order one bit of each of the groups is 0 or 1 and the third least significant bit of the subtraction result Y is 1, and outputs "0" in the other combinations. It should be noted that, when the combination of the group A and group B' corresponds to (000, 100), (010, 100), (100, 000), or (110,000) and when an operation (first operation) for two least significant bits is carried out, the carry bit calculation section 50 outputs "1" instead of "0". Specifically, in the case of (group A, group B)=($\{a_1, a_0, 0\}$, {inverted $b_1$, inverted $b_0$+1, 1})=(000, 100), (010, 100), (100, 000), (110, 000), the carry bit calculation section 50 outputs "1" instead of "0".

Only when the carry bit calculation section 50 outputs "1", the control section 23 causes the multiplication section 19 and the bit shifter 21 to execute the operation of $4 \times X \times 2^i$ using the value X obtained from the register 18. Note that the configuration of the carry bit calculation section 50 is not limited to the configuration shown in FIG. 9. Any circuit may be used as the carry bit calculation section 50 as long as the circuit outputs "1" only when the high-order one bit of each of the first group A and the second group B' is 0 or 1 and the third least significant bit of the subtraction result Y is 1. In the above description, it is assumed that the carry bit calculation section 50 shown in FIG. 9 is a circuit that simply outputs "1" only when the high-order one bit of each of the groups is 0 or 1 and the third least significant bit of the subtraction result Y is 1, and outputs "0" in the other combinations. However, as described above, when the code data is obtained from two least significant bits and when the combination corresponds to any of the above-mentioned four combinations, the carry bit calculation section 50 outputs "1" instead of "0".

The FF 25 holds the result of the adder 24 and inputs the result again to the adder 24 through the selector 26. The operation result thus obtained is input to the adder 31. The adder 31 adds the value obtained from the FF 25 and the filter coefficient Y, and the limiter circuit 32 limits the value of the adder 31 in a range of 0 to 255, for example, and outputs the limited value to the FF 33.

Figure 11:
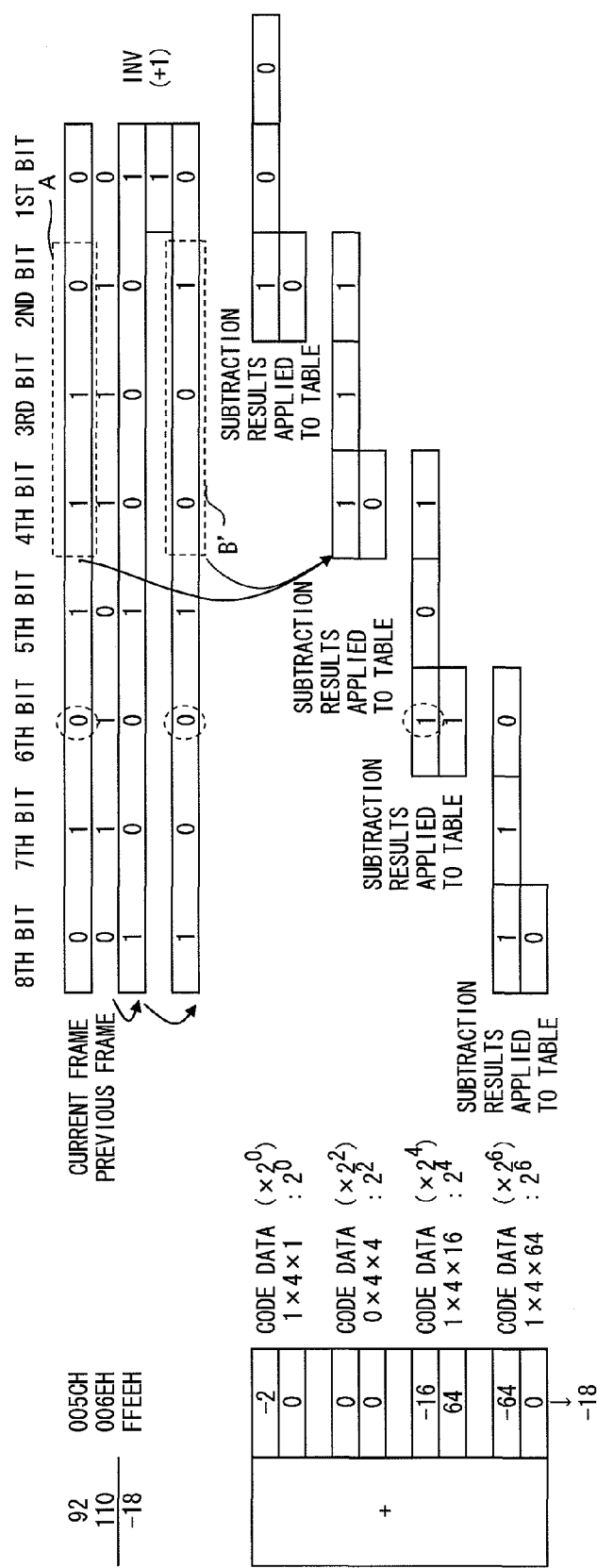
FIG. 11 is a diagram illustrating a calculation method for a Booth encoder unit.

Next, operations of the Booth encoder unit 17 will be described using specific numerical values. FIG. 11 is a diagram illustrating a calculation method for the Booth encoder unit 17. The following description is made assuming that current input data indicates 92; next input data indicates 110; and the input data is 8-bit data.

92={01011100}

110={01101110}

First, the selectors 13 and 14, which are located at the previous stage, select the first group A and the second group B. Low-order two bits are first selected from eight bits according to Booth's algorithm. The first group A is obtained by further adding "0" as the least significant bit to the two bits (A={000}). The group B is inverted because of the subtraction, and then, "1" is added. As a result, {01101110}→{10010010} is obtained.

The group B' is obtained by further adding the low-order two bits and "0" to the least significant bit (B'={100}). The addition result of the group A (000) and the group B' (100) corresponds to a subtraction result between the group A and the group B. As a result, Y={100} is obtained. Accordingly, the operation result (code data) obtained from the Booth encoder 45 is "−2". Further, since the combination does not correspond to the case where the high-order one bit of each of the first group A and the second group B' is 0 or 1 and the third least significant bit obtained after the subtraction operation is 1 (see FIG. 10), the output of the carry bit calculation section 50 is obtained as "0". In this case, (first partial product)=(code data)×X×2⁰=−2X, and (second partial product)=(operation result of carry bit calculation section 50)×4×X×2⁰=0 are satisfied.

At the next timing, the selectors 13 and 14 select the second to fourth bits as the groups A and B. In this case, assuming that the group A={110} and the group B'={001}, the subtraction result Y={111} is obtained. Accordingly, the operation result (code data) obtained from the Booth encoder 45 is "0". Further, since the combination does not correspond to the case where the high-order one bit of each of the first group A and the second group B' is 0 or 1 and the third least significant bit obtained after the subtraction operation is 1 (see FIG. 10), the output of the carry bit calculation section 50 is obtained as "0". In this case, (first partial product)=(code data)×X×2²=0, and (second partial product)=(operation result of carry bit calculation section 50)×4×X×2⁰=0 are satisfied.

Further, at the next timing, the selectors 13 and 14 select the fourth to sixth bits as the groups A and B. In this case, assuming that the group A={011} and the group B'={010}, the subtraction result Y={101} is obtained. Accordingly, the operation result (code data) obtained from the Booth encoder 45 is "−1". Further, since the combination corresponds to the case where the high-order one bit of each of the first group A and the second group B' is 0 and the third least significant bit obtained after the subtraction operation is 1 (see FIG. 10), the output of the carry bit calculation section 50 is obtained as "1". In this case, (first partial product)=(code data)×X×2⁴=−X·2⁴=−16X, and (second partial product)=(operation result of carry bit calculation section 50)×4×X×2⁴=4X·2⁴=64X are satisfied.

Furthermore, at the next timing, the selectors 13 and 14 select the sixth to eighth bits as the groups A and B. In this case, assuming that the group A={010} and the group B'={100}, the subtraction result Y={110} is obtained. Accordingly, the operation result (code data) obtained from the Booth encoder 45 is "−1". Further, since the combination does not correspond to the case where the high-order one bit of each of the first group A and the second group B' is 0 or 1 and the third least significant bit obtained after the subtraction operation is 1 (see FIG. 10), the output of the carry bit calculation section 50 is obtained as "0". In this case, (first partial product)=(code data)×X×2⁶=−X·2⁶=−64X, and (second partial product)=(operation result of carry bit calculation section 50)×4×X×2⁰=0 are satisfied.

Figure 12:
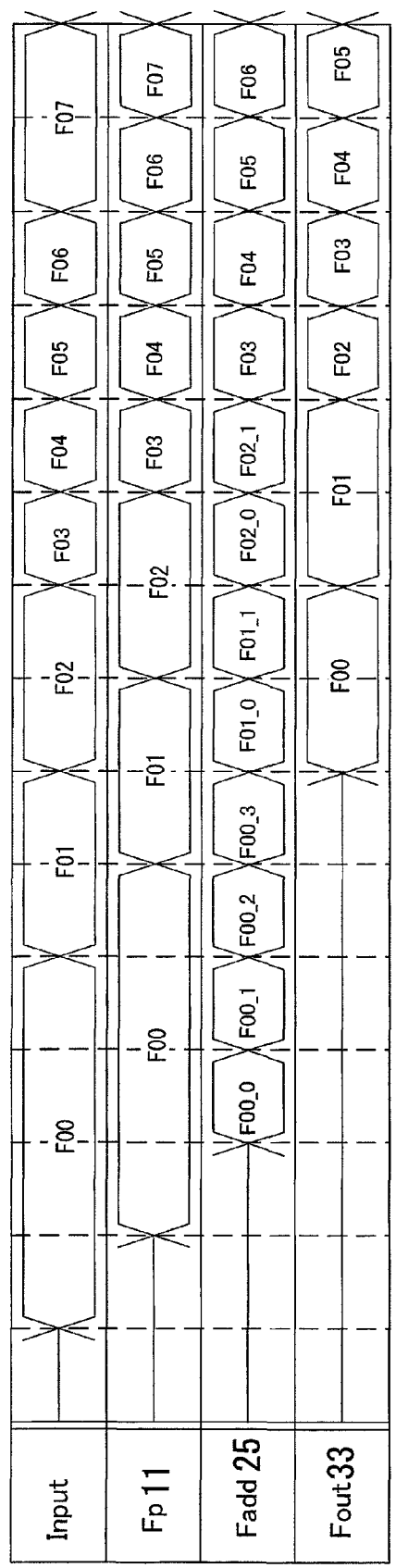
FIG. 12 is a diagram illustrating an operation timing of data input/output timing for each flip-flop of a filter operation unit according an exemplary embodiment of the present invention.
Figure 13:
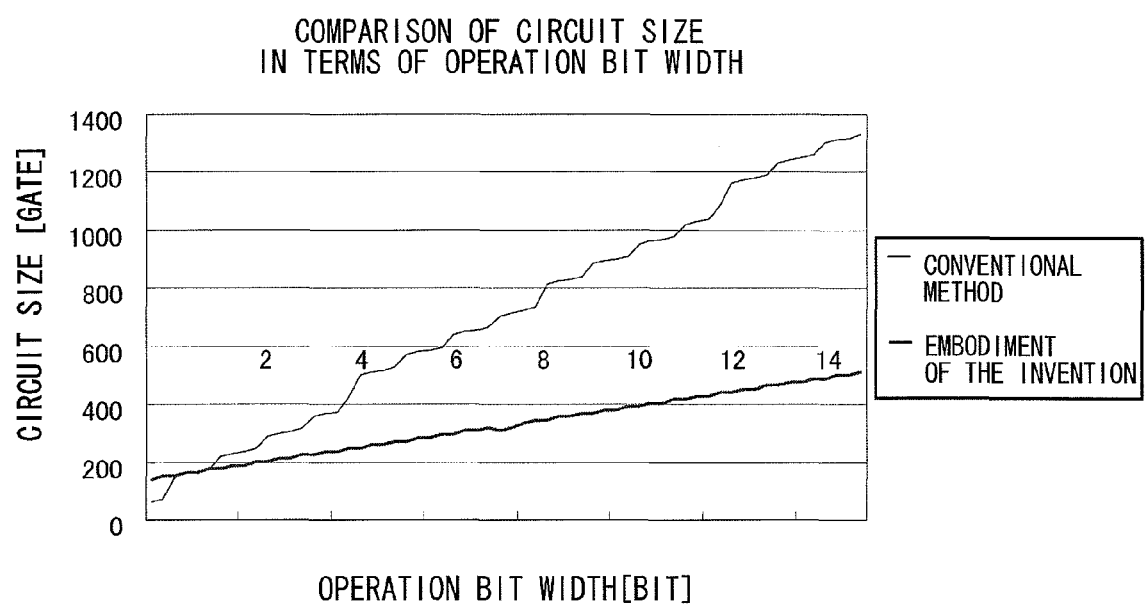
FIG. 13 is a graph having an axis of abscissa representing an input bit width and an axis of ordinate representing a circuit size (number of gates), for illustrating an effect of an exemplary embodiment of the present invention.

The adder 24 adds all the values thus obtained. In this case, −18X is obtained. FIG. 12 shows the data input/output timing of each of the flip-flops. FIG. 13 is a graph having an axis of abscissa representing an input bit width and an axis of ordinate representing a circuit size (number of gates), for illustrating an effect of an exemplary embodiment of the present invention. FIG. 13 shows that the effect of reduction in size of the subtractor increases as the input bit width increases.

Figure 14:
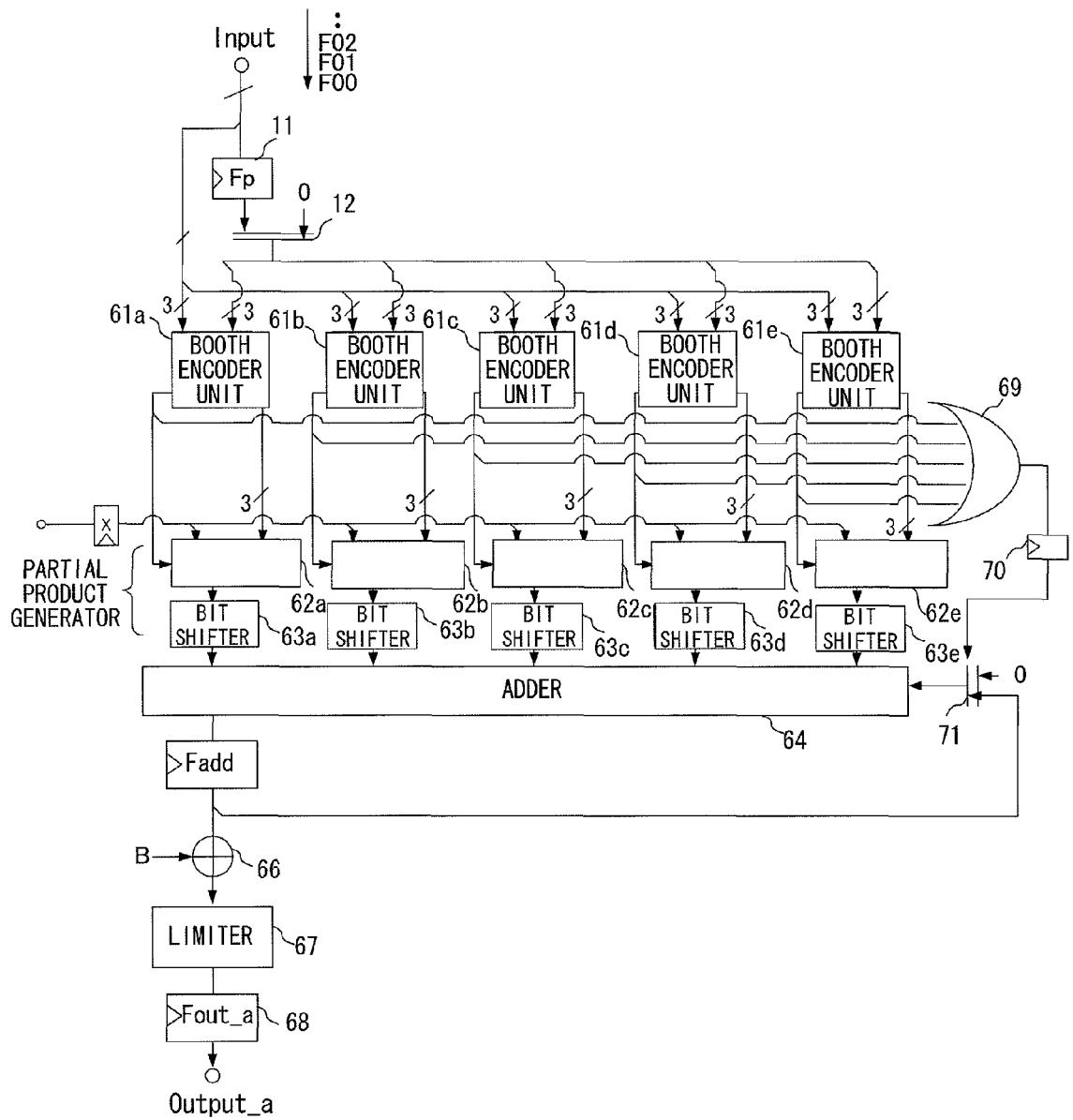
FIG. 14 is a diagram illustrating a multiplier according to a modified example of an exemplary embodiment of the present invention.
Figure 15:
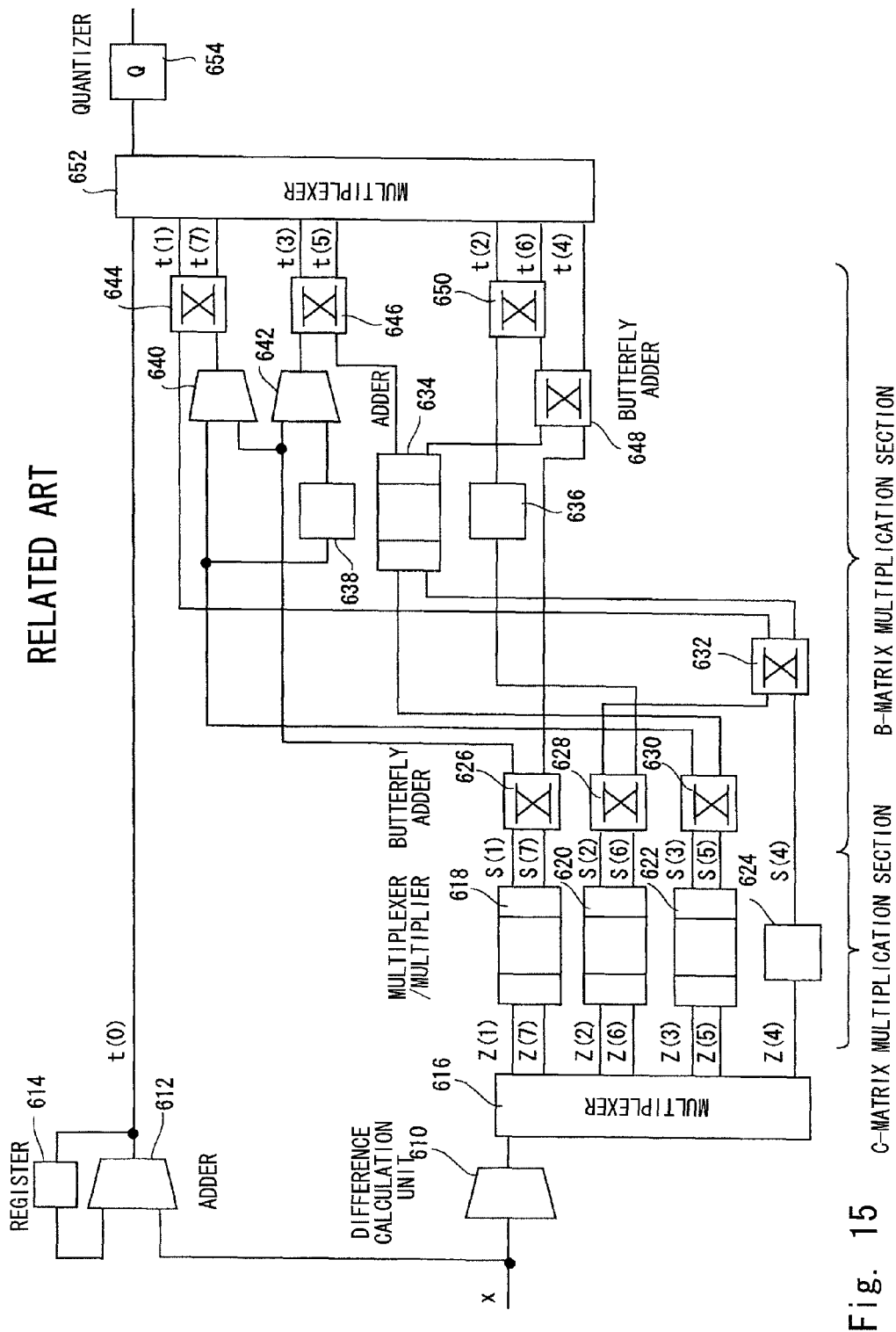
FIG. 15 is a diagram illustrating a discrete cosine transformer disclosed by Endo.

Next, a modified example of an exemplary embodiment of the present invention will be described. FIG. 14 is a diagram illustrating a modified example of an exemplary embodiment of the present invention. Note that, in this modified example, components identical with those of FIG. 4 according to an exemplary embodiment of the present invention are denoted by the same reference numerals, and a detailed description thereof is omitted. As shown in FIG. 14, a multiplier 60 includes a plurality of Booth encoder units 61a to 61e. The multiplier 60 further includes partial product generators including multiplication sections 62a to 62e and bit shifters 63a to 63e respectively corresponding to the Booth encoder units 61a to 61e. An adder 64 adds operation results obtained from the partial product generators. Further, the coefficient Y is added to the addition result through a register 65, if necessary, and the result is output through a limiter circuit 67 and an FF 68.

In a similar manner as in the above exemplary embodiment, the Booth encoder units 61a to 61e each output the subtraction result Y between the first group A and the second group B, the code data of the subtraction result Y, and the result "1" in the combination in which the high-order one bit of each of the first group and the second group is 0 or 1 and the least significant third bit obtained after the subtraction operation is 1, or the result "0" (hereinafter, referred to as "carry bit") in the other combinations. First, when of the subtraction results Y are all "1" or all "0", the multiplication sections 62a to 62e execute no operation. In cases other than the case where the subtraction results Y are all "1" or all "0", the multiplication sections 62a to 62e execute the operation for code data ×X. The bit shifters 63a to 63e execute the operation of ×2ⁱ by shifting the bits of the multiplication result. In this case, an OR circuit 69 receives the carry bit from each of the Booth encoder units 61a to 61e, and outputs "1" when at least one carry bit indicates "1". When the OR circuit 69 outputs "1", the multiplication sections 62a to 62e and the bit shifters 63a to 63e execute the operation of 4×X×2ⁱ. Specifically, the multiplication sections 62a to 62e execute the operation of 4×X, and the bit shifters 63a to 63e shift the bits of the multiplication result, thereby executing the operation of ×2ⁱ.

In this modified example, when "0" is input to the other input of the EXOR circuit 42 shown in FIG. 9, the first group A and the second group B are input to the adder 43, thereby calculating the sum of the groups A and B. In this case, the operation result indicates a value obtained by adding data twice the amount of the input data. Accordingly, the operation result is divided by 2, or the input data is halved in advance, if necessary.

Note that the present invention is not limited to exemplary embodiments described above, and various modifications can be made without departing from the gist of the present invention.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A multiplier, comprising:
   an operation unit that adds or subtracts a first group selected from a current input data, and a second group selected from a next input data corresponding to the first group to generate an operation result;
   a Booth's encoder that encodes the operation result according to Booth's algorithm, and generates code data;
   a partial product generation unit that calculates a partial product from the code data as a first partial product, and calculates, in a case where the first group and the second group are specific combination, a second partial product; and
   an adder that cumulatively adds an output from the partial product generation unit, wherein, the operation unit divides the input data into sets of two bits from a least significant bit, forms the first group and second group (Y2i+1, Y2i, Y2i−1) (i: an integer equal to or larger than 0) of three bits in total including each set and a most significant bit of each low-order set, selects the group sequentially and adds or subtracts the first group and second group, and the specific combination is a combination in which the highest-order bit of each of the first group and the second group is the same value, and the third least significant bit obtained after the subtraction operation is 1; and wherein the multiplier comprises a plurality of sets of the Booth's encoder and the partial product generation unit.

2. The multiplier according to claim 1, wherein the Booth's encoder generates the code data by calculating $-2 \cdot y_{2i+1} + y_{2i} + y_{2i-1}$ (i: an integer equal to or larger than 0).

3. The multiplier according to claim 1, wherein the partial product generation unit generates the first partial product by calculating code data $\times X \times 2^i$, and generates the second partial product by calculating $4 \times X \times 2^i$.

4. The multiplier according to claim 3, wherein the partial product generation unit comprises:

a partial product multiplier that calculates code data $\times X$ and $4 \times X$ among the first and second partial products;

a bit shifter that shifts a multiplication result of the partial product multiplier by $2^i$ bits; and a control section that controls the partial product multiplier and the bit shifter based on the operation result of the operation unit.

5. The multiplier according to claim 4, wherein, when the operation result of the operation unit is a group of bits that are not all same value, the control unit controls the partial product multiplier and the bit shifter to generate the partial product of the group.

6. A motion-compensating device that generates a predicted image, comprising:

a first filter operation section that filters input data in a vertical direction;

a second filter operation section that filters the input data in a horizontal direction; and a weighting operation section that weights one of an operation result of each of the first filter operation section and the second filter operation section, and the input data input to each of the first filter operation section and the second filter operation section, wherein:

the first filter operation section and the second filter operation section each comprise:

a Booth's encoder that encodes the operation result according to Booth's algorithm, and generates code data;

a partial product generation unit that calculates a partial product from the code data as a first partial product, and calculates, in a case where the first group and the second group are specific combination, a second partial product; and an adder that cumulatively adds an output from the partial product generation unit, wherein, the operation unit divides the input data into sets of two bits from a least significant bit, forms the first group and second group (y2i+1, y2i, Y2i−1) (i: an integer equal to or larger than 0) of three bits in total including each set and a most significant bit of each low-order set, selects the group sequentially and adds or subtracts the first group and second group, and the specific combination is a combination in which the highest-order bit of each of the first group and the second group is the same value, and the third least significant bit obtained after the subtraction operation 5 is 1; and wherein the first filter operation section and the second filter operation section each comprises a plurality of sets of the Booth's encoder and the partial product generation unit.

7. The multiplier according to claim 6, wherein the Booth's encoder generates the code data by calculating $-2 \cdot y_{2i+1} + y_{2i} + y_{2i-1}$ (i: an integer equal to or larger than 0).

8. The motion-compensating device according to claim 6, wherein the partial product generation unit generates the first partial product by calculating code data $\times X \times 2^i$, and generates the second partial product by calculating $4 \times X \times 2^i$.

9. The motion-compensating device according to claim 8, wherein the partial product generation unit comprises:

a partial product multiplier that calculates code data $\times X$ and $4 \times X$ among the first and second partial products;

a bit shifter that shifts a multiplication result of the partial product multiplier by $2^i$ bits; and a control section that controls the partial product multiplier and the bit shifter based on the operation result of the operation unit.

10. The motion-compensating device according to claim 9, wherein, when the operation result of the operation unit is a group of bits that are not all same value, the control unit controls the partial product multiplier and the bit shifter to generate the partial product of the group.

* * * * *